(12) United States Patent
Bianco et al.

(10) Patent No.: US 10,574,083 B2
(45) Date of Patent: Feb. 25, 2020

(54) ELECTRONIC CHARGER FOR ELECTRIC POWER DISTRIBUTION INSTALLATIONS AND A CONTROL METHOD THEREOF

(71) Applicant: ABB Schweiz AG, Baden (CH)

(72) Inventors: Andrea Bianco, Sesto San Giovanni (IT); Andrea Ricci, Dalmine (IT); Gabriele Valentino De Natale, Milan (IT); Marco Testa, Dalmine (IT)

(73) Assignee: ABB Schweiz AG, Baden (CH)

( * ) Notice: Subject to any disclaimer, the term of this patent is extended or adjusted under 35 U.S.C. 154(b) by 119 days.

(21) Appl. No.: 15/566,988

(22) PCT Filed: Mar. 4, 2016

(86) PCT No.: PCT/EP2016/054690
§ 371 (c)(1),
(2) Date: Oct. 16, 2017

(87) PCT Pub. No.: WO2016/165875
PCT Pub. Date: Oct. 20, 2016

(65) Prior Publication Data
US 2018/0138734 A1    May 17, 2018

(30) Foreign Application Priority Data
Apr. 14, 2015   (EP) .................................... 15163519

(51) Int. Cl.
*H02J 7/00*  (2006.01)
*H02J 7/04*  (2006.01)
(Continued)

(52) U.S. Cl.
CPC .............. *H02J 7/045* (2013.01); *H02J 7/022* (2013.01); *H02J 7/06* (2013.01); *H02M 3/155* (2013.01);
(Continued)

(58) Field of Classification Search
CPC .. H02J 2007/0059; H02J 7/0052; H02J 7/022; H02J 7/045; H02J 7/06;
(Continued)

(56) References Cited

U.S. PATENT DOCUMENTS

| 2009/0045788 A1 | 2/2009 | Williams et al. |
| 2009/0110214 A1 | 4/2009 | Litovsky et al. |

(Continued)

FOREIGN PATENT DOCUMENTS

WO     2014200697 A1    12/2014

OTHER PUBLICATIONS

Rashid, et al., Power ELectronics Handbook, Third Edition 2011, pp. 540-541.

(Continued)

*Primary Examiner* — Vuthe Siek
(74) *Attorney, Agent, or Firm* — Taft Stettinius & Hollister LLP; J. Bruce Schelkopf (57) ABSTRACT

An electronic charger for electric power distribution installations is provided. The electronic charger includes a DC/DC converter of the SEPIC type including an input stage, an output stage and a coupling capacitor. The input stage is electrically connected with input terminals and includes an input inductor and a switching device. The output stage is electrically connected with output terminals and includes an output inductor, an output capacitor and a blocking device. The coupling capacitor is configured to electrically couple the input stage and the output stage with a capacitive coupling. A first sensor provides a first sensing signal indicative of a charging current. A first controller receives the first sensing signal and a reference signal and provides a driving signal to control the switching device.

15 Claims, 6 Drawing Sheets

(51) Int. Cl.
*H02J 7/02* (2016.01)
*H02J 7/06* (2006.01)
*H02J 7/34* (2006.01)
*H02M 3/155* (2006.01)

(52) U.S. Cl.
CPC ...... *H02J 7/345* (2013.01); *H02M 2003/1557* (2013.01)

(58) Field of Classification Search
CPC .. H02J 7/345; H02J 7/0077; H02J 7/34; H02J 7/04; H02J 7/00; H02M 2003/1557; H02M 3/155
See application file for complete search history.

(56) References Cited

U.S. PATENT DOCUMENTS

| | | | |
|---|---|---|---|
| 2010/0026248 A1* | 2/2010 | Barrade | H02J 7/0054 320/166 |
| 2013/0119923 A1 | 5/2013 | Wright et al. | |
| 2016/0016479 A1* | 1/2016 | Khaligh | B60L 11/1812 363/17 |
| 2016/0254689 A1* | 9/2016 | Lee | H02M 3/158 320/107 |

OTHER PUBLICATIONS

International Search Report and Written Opinion, PCT/EP2016/054690, ABB Technology AG, dated Jun. 1, 2016, 13 pages.

* cited by examiner

ELECTRONIC CHARGER FOR ELECTRIC POWER DISTRIBUTION INSTALLATIONS AND A CONTROL METHOD THEREOF

BACKGROUND

The present invention relates to an electronic charger for electric power distribution installations operating at medium voltage level.

For the purposes of the present invention, the term medium voltage (MV) identifies operating voltages higher than 1 kV AC and 1.5 kV DC up to some tens of kV, e.g. up to 72 kV AC and 100 kV DC.

Electric power distribution installations operating at MV level may comprise, for example, MV switchboards, MV power supply systems, MV switching apparatuses (e.g. circuit breakers, contactors, disconnectors, reclosers, etc.) and the like.

As is known, in many installations of the type above capacitor banks or batteries are adapted to store huge amounts of electrical energy (typically some thousands of Joule).

This is particularly true for MV switching apparatuses comprising an electromagnetic actuator. In these devices, the power supply stage is not generally designed to harvest the electric power needed for operating the actuator directly from the available power supply.

Such a choice would in fact entail relevant drawbacks in terms of size, industrial costs and component assembling since the actuator may require high peaks of electric power during operation.

For this reason, the power supply stage of a MV switching apparatus generally comprises one or more capacitor banks, which are adapted to store electrical energy to properly feed the actuator even when relatively high electric power peaks are needed for operation.

In electric power distribution installations operating at MV level, an electronic charger is typically provided to charge such huge capacitive loads by drawing electric power from the available power supply (e.g. a MV electric line).

Generally, a traditional electronic charger comprises a DC/DC switching converter of fly-back type or boost type.

Unfortunately, the experience has shown that charging such huge capacitive loads is a difficult process to manage.

The adoption of linear charging techniques is not suitable as the electronic charger should be designed to provide a DC voltage higher than the final charging voltage desired for the capacitor banks. This would entail relevant drawbacks in terms of electric power dissipation.

On the other hand, due to their huge size, these capacitive loads electrically behave as short circuits at the beginning of the charging process and as open circuits, when the charging process is almost complete and the final charging voltage is almost reached.

Thus, ideally, current control techniques should be adopted at the first steps of charging process whereas voltage control techniques should be adopted, when the voltage across the capacitor banks is closer to the desired final charging voltage.

Traditional electronic chargers are still not able to provide performances of this kind.

Further, they show some additional drawbacks.

Electronic chargers, which comprise a DC/DC fly-back converter, typically show high electric power dissipation as leakage currents, which are due to the leakage inductance of the converter transformer) are present when the converter switch is in an OFF state (interdiction or cut-off state).

In addition, electronic chargers of this type generally offer poor performances in terms of output voltage regulation as the winding ratio of the converter transformer substantially determine whether the converter is of the step-up type or step-down type.

Further, these electronic chargers show high reflected voltages on the converter switch, when this latter switches in an OFF state. Such reflected voltages may cause stress failures on the converter switch.

Electronic chargers, which comprise a DC/DC boost converter, typically show high current ripples at the input stage. These phenomena may entail high electromagnetic emissions and shortening of the useful life of the electronic components. Expensive circuit configurations need often to be arranged to deal with these problems.

SUMMARY

The main aim of the present invention is to provide an electronic charger for electric power distribution installations operating at MV level that allows overcoming the drawbacks of the known art.

Within this aim, a purpose of the present invention is to provide an electronic charger, which is capable of efficiently managing the charging process of a huge-size capacitive load (e.g. the capacitor banks of a switching apparatus).

A further purpose of the present invention is to provide an electronic charger, which shows low electric power dissipation with respect to currently available electronic chargers.

A further purpose of the present invention is to provide an electronic charger, which shows high performances in terms of output voltage regulation.

A further purpose of the present invention is to provide an electronic charger, which is relatively simple and cheap to be manufactured at industrial levels.

The above aim and purposes, as well as other purposes that will emerge clearly from the following description and attached drawings, are provided according to the invention by an electronic charger, according to the following claim 1 and the related dependent claims.

In a further aspect, the present invention provides an electric power distribution installation operating at MV level, according to the following claim 9.

In a further aspect, the present invention provides a MV switching apparatus, according to the following claim 10.

In yet a further aspect, the present invention provides a control method, according to the following claim 11 and the related dependent claims.

BRIEF DESCRIPTION OF THE FIGURES

Further characteristics and advantages of the present invention will become more apparent from the detailed description of preferred embodiments illustrated only by way of non-limitative example in the accompanying drawings, in which.

DETAILED DESCRIPTION

Referring to the cited figures, the present invention is related to an electronic charger 1 for electric power distribution installations operating at MV level.

The electronic charger 1 is particularly suitable for charging huge capacitive loads, for example the capacitor banks of a MV switching apparatus, such as a MV circuit breaker, contactor, disconnector, recloser and the like.

However, the electronic charger 1 may be used to charge capacitive loads in other electric power distribution installations operating at MV level, such as in MV switchboards, MV power supply systems and the like.

The electronic charger 1 comprises input terminals 21-22, which can be electrically connected to an electric power supply 50.

As an example, the power supply 50 may be an auxiliary power supply unit of known type arranged to draw electric power from a power distribution line.

One or more electric and/or electronic circuits of known type may be suitably arranged to electrically couple the power supply 50 to the input terminals 21-22 of the electronic charger 1.

As an example, an interface circuit 51 including one or more diode bridges and/or filtering circuits may be arranged to provide a DC voltage to the electronic charger 1.

The electronic charger 1 comprises output terminals 23-24, which can be electrically connected to an electric load 60 to be charged.

Preferably, the load 60 is a capacitive load, which may be configured to store relatively high levels of electric energy (e.g. thousands of Joule).

As an example, the capacitive load 60 may be formed by the capacitor banks of a MV switching apparatus.

One or more electric and/or electronic circuits of known type may be suitably arranged to electrically couple the output terminals 23-24 and the capacitive load 60.

As an example, a blocking circuit 61 including one or more diodes may be suitably arranged to prevent (in given operating conditions) the flow of a discharging current from the capacitive load 60 towards the electronic charger 1.

The input terminals of the electronic charger 1 comprise a first input terminal 21, at a given voltage, and a second input terminal 22, which is preferably grounded.

Similarly, the output terminals of the electronic charger 1 comprise a first output terminal 23, at a given voltage, and a second output terminal 24, which is preferably grounded.

The electronic charger 1 receives a DC input voltage VIN at the input terminals 21-22 and it provides a DC output voltage VOUT at the output terminals 23-24.

The electronic charger 1 comprises a DC/DC switching converter 2 of SEPIC (Single Ended Primary Inductor Converter) type.

The converter 2 comprises an input stage 2A, which is electrically connected with the input terminals 21-22.

The input stage 2A comprises an input inductor 11, which is adapted to store electric energy provided by the power supply 50.

Further, the input stage 2A comprises a switching device Q1, which is configured to control the charging process of the input inductor 11, so that this latter is charged, when the switching device Q1 is in an ON state (conduction state), and is discharged, when the switching device Q1 is in an OFF state (interdiction or cut-off state).

Preferably, the input stage 2A comprises also an input capacitor 17.

The converter 2 comprises an output stage 2B, which electrically connected with the output terminals 23-24 and comprises an output inductor 12, which is magnetically coupled with the input inductor 11.

Preferably, the input and output inductors 11, 12 are respectively formed by first and second windings wound on a same magnetic core element.

The output stage 2B comprises also an output capacitor 15, which is configured to store electric energy to feed the capacitive load 60.

Preferably, the output capacitor 15 is adapted to receive electric energy from the input and output inductors 11-12, when the switching device Q1 is in an OFF state, and to provide electric energy to the capacitive load 60, when the switching device Q1 is in an ON state.

The output stage 2B further comprises a blocking device 16, which is configured to prevent the flow of a discharging current from the output capacitor 15 towards the input and/or output inductors 11, 12, when the switching device Q1 is in an OFF state.

The converter 2 further comprises a coupling capacitor 14, which is configured to electrically couple the input stage 2A and the output stage 2B by means of a capacitive coupling.

Figure 1:
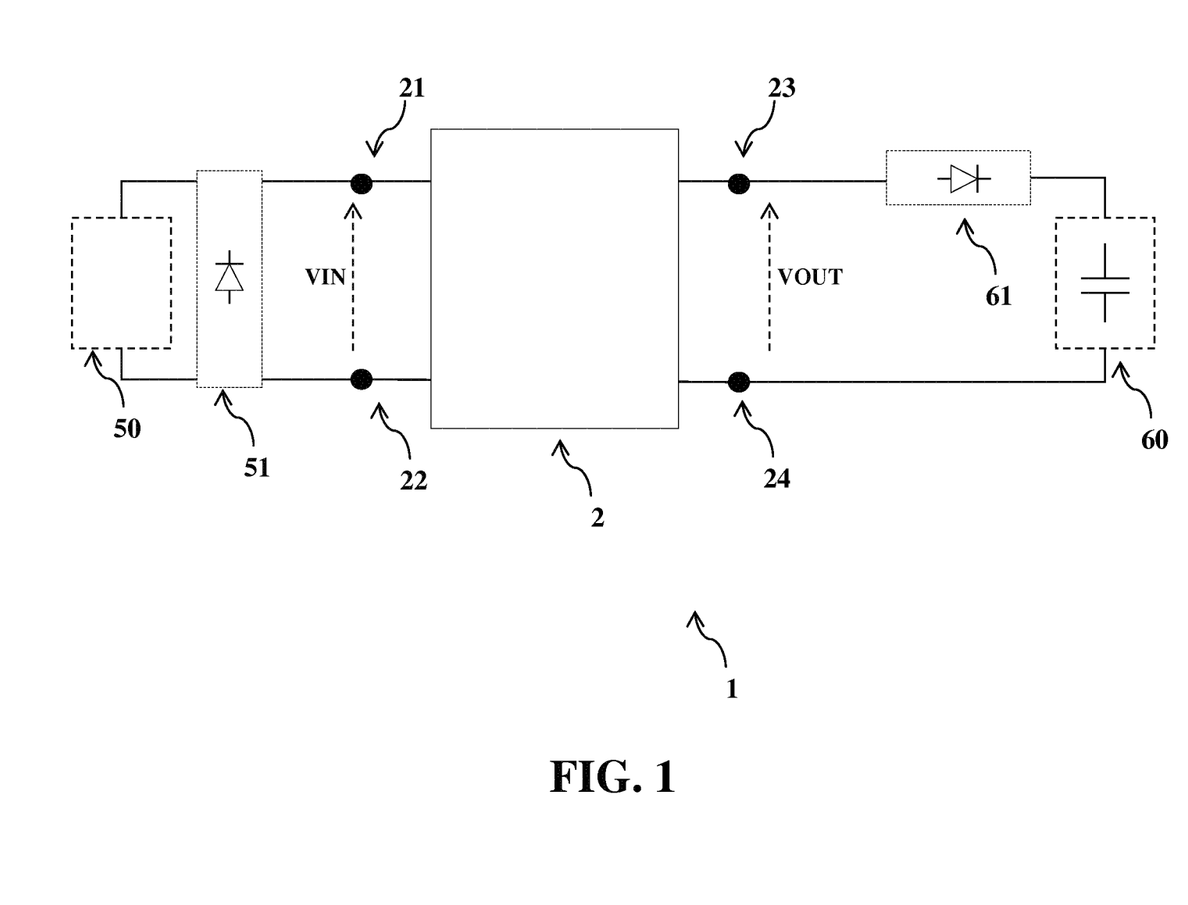
FIGS. 1-2 are block diagrams that schematically show an embodiment of the electronic charger according the invention.
Figure 2:
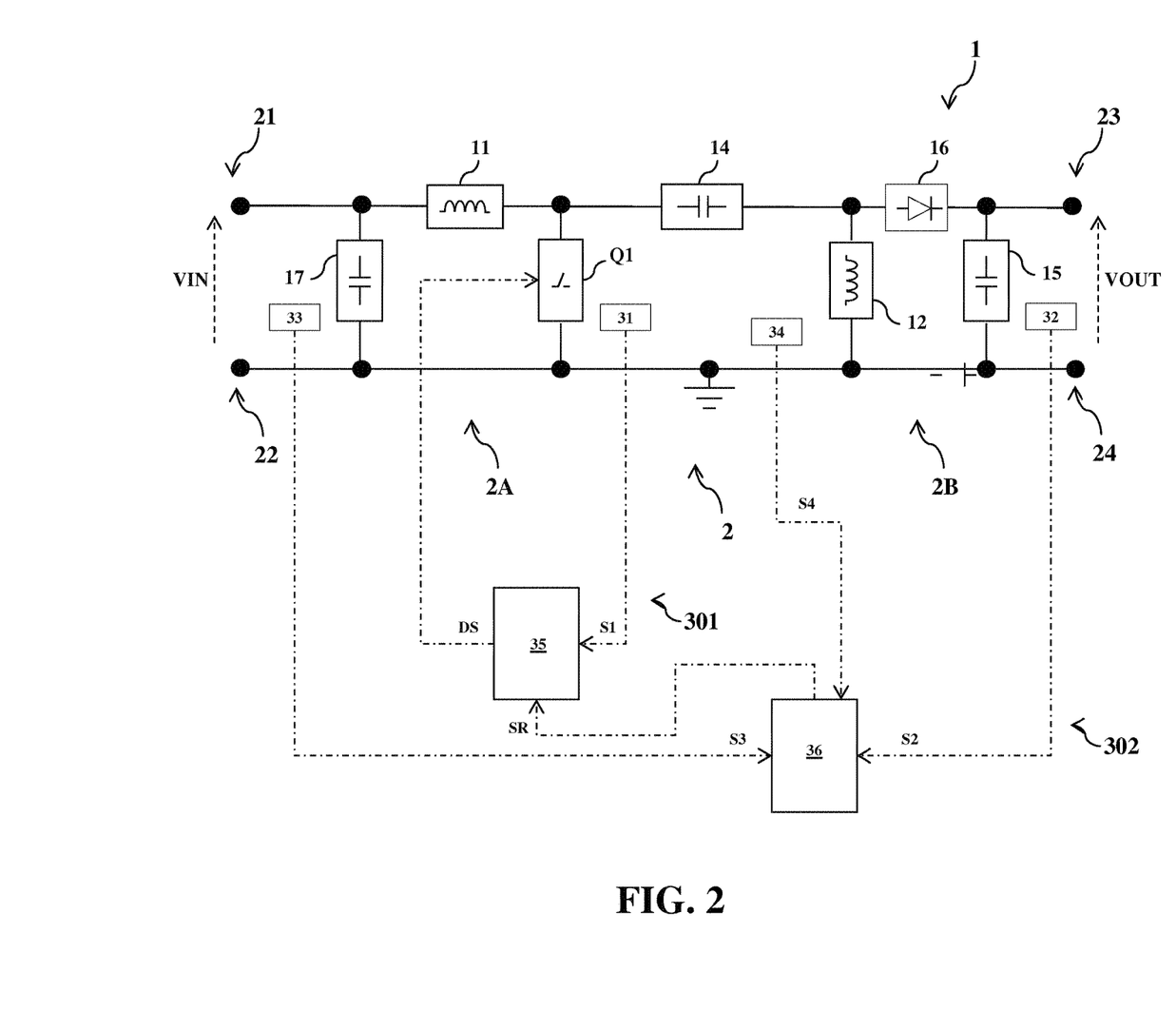

In a preferred embodiment of the invention, the input stage 2A has the configuration shown in FIG. 2.

The input inductor 11 is electrically connected in series to the first input terminal 21. In particular, the input inductor 11 has a first terminal, which is electrically connected to the first input terminal 21, and a second terminal, which is electrically connected to a first terminal of the coupling capacitor 14.

The switching device Q1 is electrically connected in parallel with respect to input terminals 21-22.

In particular, the switching device Q1 has a first terminal, which is electrically connected to the second terminal of the input inductor 11 and to the first terminal of the coupling capacitor 14, and a second terminal, which is electrically connected to the second input terminal 22.

The switching device Q1 has also a control terminal, which is suitable to receive a driving signal DS for controlling its operation.

Preferably, the switching device Q1 is a power MOSFET of n-type having the drain terminal, which is electrically connected to the second terminal of the input inductor 11 and to the first terminal of the coupling capacitor 14, and the source terminal, which is electrically connected to the second input terminal 22. The gate terminal of the MOSFET Q1 forms the control terminal adapted to receive the driving signal DS.

Preferably, the input capacitor 17 has terminals electrically connected in parallel to the input terminals 21-22.

In a preferred embodiment of the invention, the output stage 2B has the configuration shown in FIG. 2.

The blocking device 16 is preferably a blocking diode (preferably of Schottky type) having a first terminal (anode terminal), which is electrically connected to a second terminal of the coupling capacitor 14, and a second terminal (cathode terminal), which is electrically connected to a first output terminal 23.

The output inductor 12 has a first terminal, which is electrically connected to the first terminal of the blocking diode 16 and to the second terminal of the coupling capacitor 14, and a second terminal, which is electrically connected to the second output terminal 24.

The output capacitor 15 has terminals electrically connected in parallel to the output terminals 23-24.

The coupling capacitor 14 has a first terminal, which is electrically connected with the second terminal of the input inductor 11 and with the first terminal of the switching device Q1, and a second terminal, which is electrically connected to the first terminal of the output inductor 12 and to the first terminal of the blocking diode 16.

The operation of the converter 2 is briefly described with reference to the FIGS. 3-4.

Figure 3:
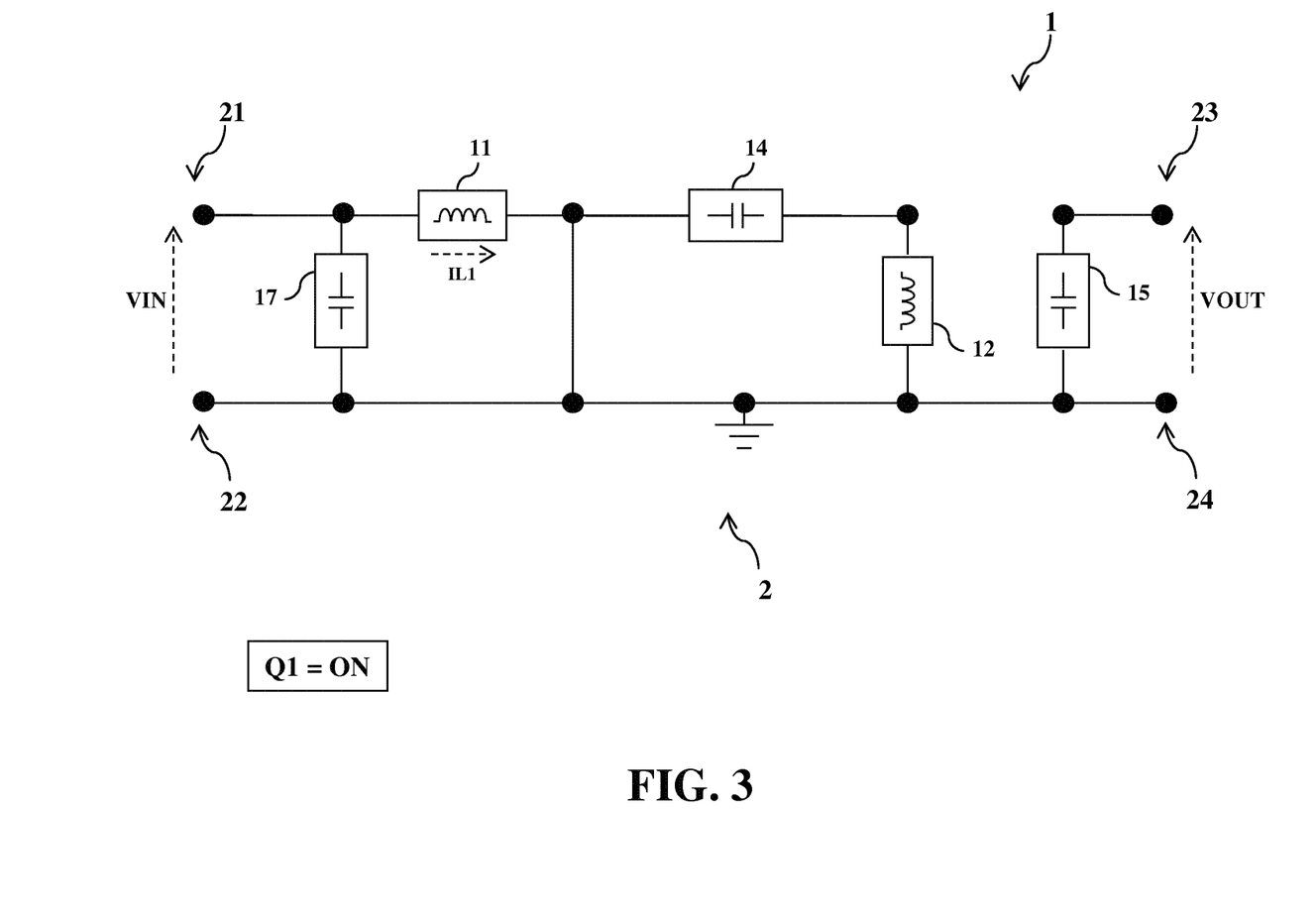
FIGS. 3-5 are block diagrams that schematically show the operation of the electronic charger according the invention.

When the switching device Q1 is in an ON state, the converter 2 shows the equivalent circuit configuration of FIG. 3.

Both the inductors 11, 12 are electrically decoupled from the output capacitor 15.

The input inductor 11 is charged by the energy provided by the power supply 50.

As the power supply 50 provides an input voltage VIN, a charging current IL1 flows throw the input inductor 11. Since the input voltage VIN is a DC voltage, the current IL1 progressively increases with a substantially linear trend (FIG. 5).

The output inductor 12 is charged by the energy stored by the coupling capacitor 14.

Figure 5:
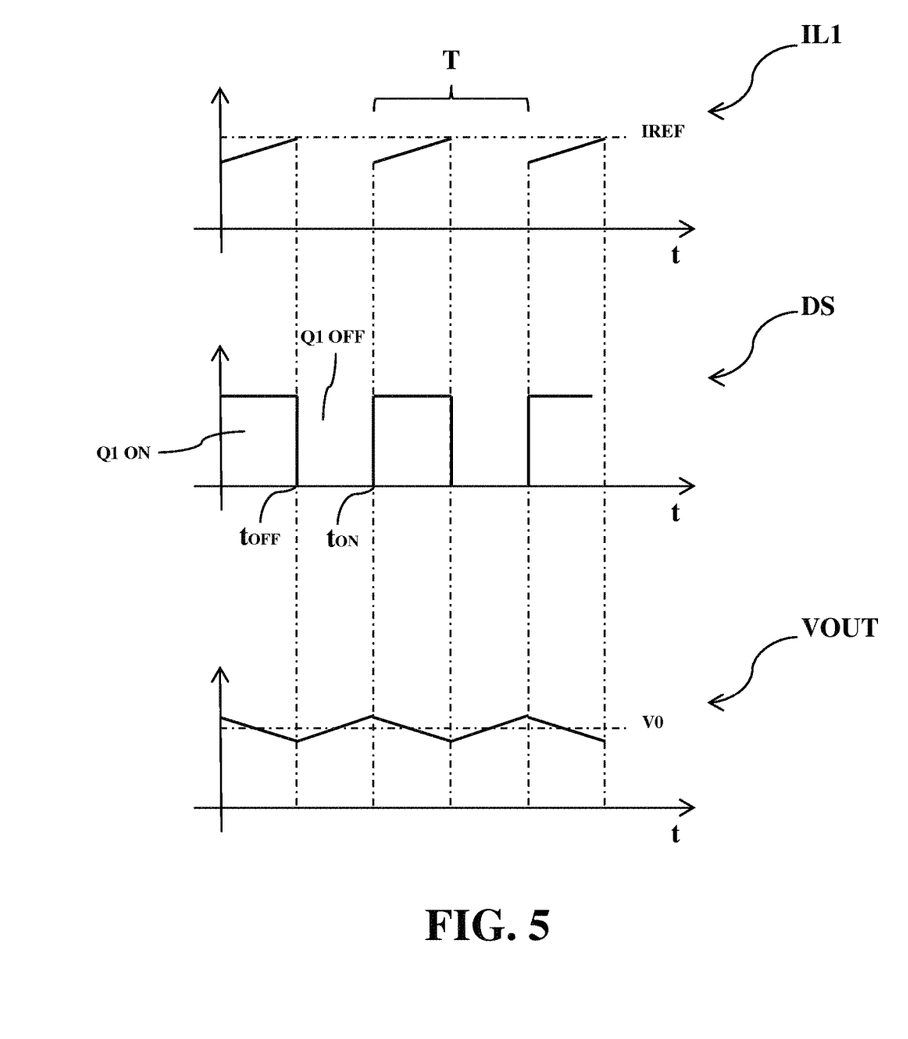

The output capacitor 15 provides energy to the conductive load 60 and the output voltage VOUT progressively decreases (FIG. 5).

Figure 4:
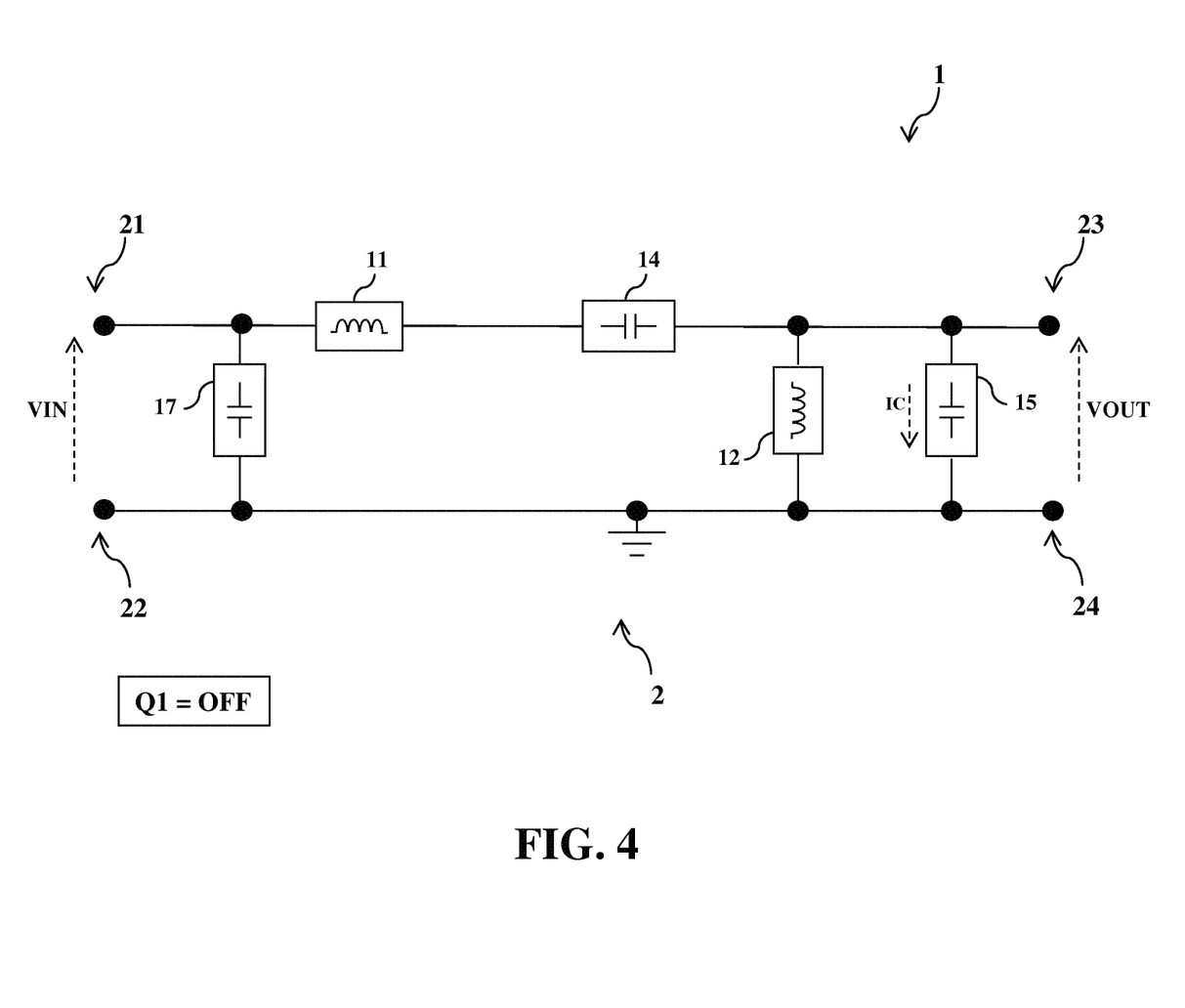

When the switching device Q1 is in an OFF state, the converter 2 shows the equivalent circuit configuration of FIG. 4.

Both the inductors 11, 12 are now electrically coupled to the output capacitor 15.

The input inductor 11 provides electric energy to the coupling capacitor C1 and the output capacitor COUT.

Also the output inductor 12 provides energy to the output capacitor COUT.

This latter receives a charging current IC that is due to the currents provided by the inductors 11, 12.

The output capacitor 15 is charged and the output voltage VOUT progressively increases.

According to the invention, the electronic charger 1 comprises a first sensor 31 configured to provide a first sensing signal S1 indicative of the charging current IL1, which flows through the input inductor 11 to charge it when the switching device Q1 is in an ON state.

The first sensor 31 may be of known type, for example a shunt resistor.

Preferably, the electronic charger 1 comprises a second sensor 32 configured to provide a second sensing signal S2 indicative of the output voltage VOUT at the output terminals 23-24. The second sensor 32 may be of known type, for example a resistive voltage divider.

Preferably, the electronic charger 1 comprises a third sensor 33 configured to provide a third sensing signal S3 indicative of the input voltage VIN at the input terminals 21-22. The third sensor 33 may be of known type, for example a resistive voltage divider.

Preferably, the electronic charger 1 comprises a fourth sensor 34 configured to provide a fourth sensing signal S4 indicative of the operating temperature of the electronic charger 1. The temperature sensor 34 may be of known type, for example a thermocouple.

According to the invention, the electronic charger 1 comprises a first controller 35.

The first controller 35 may comprise a digital processing device (such as a microprocessor), which is capable of storing and executing suitable software instructions, e.g. for signal processing purposes and/or control purposes.

The first controller 35 is operatively coupled to the first sensor 31 and to the switching device Q1.

The first controller 35 is thus adapted to receive the first sensing signal S1.

The first controller 35 is also adapted to receive a reference signal SR, which is indicative of a reference value for the charging current IL1.

The first controller 35 is configured to provide the driving signal DS for controlling the operation of the switching device Q1 on the base of the information provided by the sensing signal S1 and the reference signal SR.

The driving signal DS (preferably of pulsed type) is configured such that the switching device Q1 turns from the OFF state to the ON state at given switch-on instants $t_{ON}$ and turns from the ON state to the OFF state at given switch-off instants $t_{OFF}$.

According to the invention, the driving signal DS is configured so that the switching device Q1 is turned in an ON state at predefined switch-on instants $t_{ON}$ and is turned in an OFF state at switch-off instants $t_{OFF}$, which are determined by processing the information provided by the first sensing signal S1 and the reference signal SR.

In other words, according to the invention, the controller 35 is configured to turn the switching device Q1 in an ON state at predefined switch-on instants ($t_{ON}$) and to turn the switching device in an OFF state at switch-off instants ($t_{OFF}$), which are determined on the base of the information provided by the first sensing signal S1 and the reference signal SR.

Switch-on instants $t_{ON}$ may be determined by the controller 31 on the base of predefined settings. Preferably, the switch-on instants $t_{ON}$ are instants having a predefined frequency F=1/T, where T is the predefined time period between two following switch-on instants.

In order to determine the switch-off instants $t_{OFF}$, the controller 35 may adopt different control logics.

Preferably, the controller 35 determines the switch-off instants $t_{OFF}$ by comparing the values of charging current IL1, which are provided by the sensing signal S1, with a reference value IREF, which is provided by the reference signal SR.

Preferably, the controller 35 determines the switch-off instants $t_{OFF}$ as the instants at which, during the charging process of the input inductor 11 (i.e. when the switching device Q1 is turned in an ON state), the sensed charging current IL1 is equal to or exceeds the reference value IREF (FIG. 5).

In general, the first controller 35 and the first sensor 31 form a first control loop 301 for controlling the charging/discharging process of the input inductor 11 by switching off the switching device Q1 at selected switch-off instants that are determined on the base of the charging current IL1 flowing through the input inductor 11.

As shown in FIG. 5, the first control loop 301 preferably adopts a PWM modulation technique to provide the driving signal DS for controlling the switching of the switching device Q1.

According to a preferred embodiment of the invention, the electronic charger 1 comprises a second controller 36.

The second controller 36 may comprise a digital processing device (such as a microprocessor), which is capable of storing executing suitable software instructions, e.g. for signal processing purposes or control purposes.

The second controller 36 is advantageously configured to provide the reference signal SR to the first controller 35.

In particular, the second controller 36 is configured to receive the second sensing signal S2 and process the information provided by the second sensing signal S2 to provide the reference signal SR.

The second controller 36 and the second sensor 32 form a second control loop 302, which cooperate with the first control loop formed by the first controller 35 and the first sensor 31, for controlling the output voltage VOUT provided at the output terminals 23-24.

In particular, the second control loop 302 is configured to set the reference signal SR as a function of the output voltage VOUT.

In this way, the charging/discharging process of the input inductor 11 is properly controlled by the first control loop 301 to obtain a given voltage level V0 for the output voltage VOUT (a part from a voltage ripple deriving from the PWM modulation of the charging current IL1 in the inductor 11).

Preferably, the second control loop 302 may be configured to set the reference signal SR on the base of different physical quantities in the electronic charger 1.

Preferably, the second control loop 302 comprises the third sensor 33 and the second controller 36 is configured to receive the third sensing signal S3, which is provided by the third sensor 33, and process the information provided by the third sensing signal S3 to provide the reference signal SR.

In this way, the reference signal SR (set by the second control loop 302) results also a function of the output voltage VIN.

The electronic charger 1 may thus be adopted for a broader range of input voltages VIN, thereby providing an outstanding performance in terms of flexibility of use, as the response of the first and second control loops 301, 302 may vary according to the input voltage VIN.

Preferably, the second control loop 302 comprises the fourth sensor 34 and the second controller 36 is configured to receive the fourth sensing signal S4, which is provided by the fourth sensor 34, and process the information provided by the fourth sensing signal S4 to provide the reference signal SR.

In this way, the reference signal SR (set by the second control loop 302) results also a function of the operating temperature of the electronic charger 1.

This may bring relevant advantages in reducing thermal stresses on electronic components.

Figure 6:
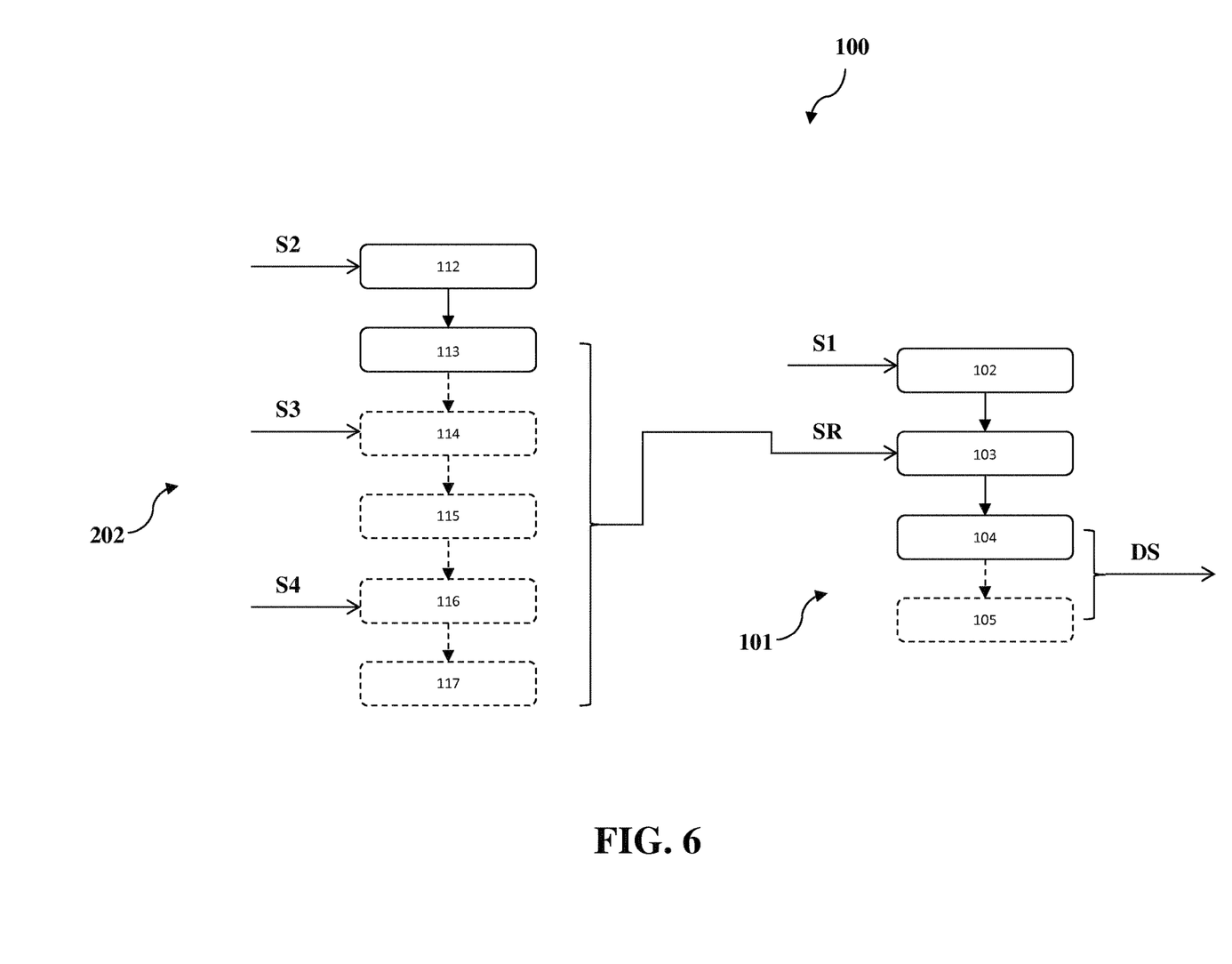
FIG. 6 is a block diagram that schematically shows a control method for operating the electronic charger according the invention.

In a further aspect, the present invention relates to a control method 100 for the electronic charger 1, which is structured as illustrated above.

The control method 100 comprises a first control procedure 101, which is carried out by the first control loop 301. The control procedure 101 comprises:
the step 102 of acquiring the first sensing signal S1 from the first sensor 31;
the step 103 of acquiring the reference signal SR;
the step 104 of providing the driving signal DS for controlling the switching device Q1.

The driving signal DS is configured so that the switching device Q1 is turned in an ON state at predefined switch-on instants ($t_{ON}$) and is turned in an OFF state at switch-off instants ($t_{OFF}$), which are determined by processing the information provided by the sensing signal S1 and the reference signal SR.

Preferably, the switch-on instants ($t_{ON}$) have a predefined frequency.

Preferably, the control procedure 101 comprises the step 105 of determining the switch-off instants $t_{OFF}$ by comparing the value of charging current IL1, which are provided by the sensing signal S1, with a reference value IREF, which is provided by the reference signal SR.

Preferably, the switch-off instants $t_{OFF}$ are determined as the instants at which, during the charging process of the input inductor 11 (i.e. when the switching device Q1 is turned in an ON state), the sensed charging current IL1 exceeds the reference value IREF.

Preferably, the control method 100 comprises a second control procedure 202, which is carried out by the second control loop 302 concurrently with the first control procedure executed by the first control loop 301. The control procedure 202 comprises:
the step 112 of acquiring the second sensing signal S2 from the second sensor 32;
the step 113 of processing the information provided by said second sensing signal S2 to provide the reference signal SR.

Preferably, the control procedure 202 comprises:
the step 114 of acquiring the third sensing signal S3 from the third sensor 33;
the step 115 of processing the information provided by the sensing signal S3 to provide the reference signal SR.

Preferably, the control procedure 202 comprises:
the step 116 of acquiring the fourth sensing signal S4 from the fourth sensor 34;
the step 117 of processing the information provided by the sensing signal S3 to provide the reference signal SR.

Preferably, the first and second controllers 35, 36 comprise digital processing devices (such as a microprocessor) capable of storing executing suitable software instructions, e.g. for carrying out the steps of the control method 100 described above.

The electronic charger 1 of the invention provides relevant advantages.

The adoption of a DC/DC switching converter having a configuration of SEPIC type allows reducing dissipation losses.

The adoption of coupled input and out inductors 11, 12 allows reducing the overall power supply footprint and reducing electrical stresses on the coupling capacitor 14.

The first and second control loops 301, 302 allow effectively managing the charging process of the capacitive load 60.

At the early stages of the charging process, when the capacitive load 60 behaves as a short circuit, the first and second control loops 301, 302 provide an effective current control thereby limiting the current peaks flowing through inductors 11, 12.

When the charging process is almost complete and when the capacitive load 60 behaves as an open circuit, provide a smooth output voltage regulation.

The electronic charger 1 is characterised by high performance in terms of flexibility of use.

The electronic charger 1 can be easily manufactured at industrial level at competitive costs.

The invention claimed is:
1. An electronic charger for electric power distribution installations, comprising:
input terminals, which are electrically connectable to an electric power supply;
output terminals, which are electrically connectable to an electric load to be charged;
a DC/DC converter of SEPIC type comprising:
an input stage electrically connected with said input terminals and comprising an input inductor, which is configured to store electric energy provided by said power supply, and a switching device, which is configured to control a charging process of said input inductor;
an output stage electrically connected with said output terminals and comprising an output inductor, which is magnetically coupled with said input inductor, an output capacitor, which is configured to store electric energy to feed said capacitive load, and a blocking device, which is configured to prevent the flow of a discharging current from said output capacitor towards said input and output inductors;

a coupling capacitor, which is configured to electrically couple said input stage and said output stage by means of a capacitive coupling;

a first sensor configured to provide a first sensing signal indicative of a charging current flowing through said input inductor, when said switching device is in an ON state;

a first controller configured to acquire said first sensing signal and a reference signal indicative of a reference value for said charging current and configured to provide a driving signal for controlling said switching device, said first controller being configured to turn said switching device in an ON state at predefined switch-on instants ($t_{ON}$) and to turn said switching device in an OFF state at switch-off instants ($t_{OFF}$), which are determined by said controller by processing the information provided by said first sensing signal and said reference signal.

2. The electronic charger, according to claim 1, wherein said switch-on instants ($t_{ON}$) have a predefined frequency.

3. The electronic charger, according to claim 1, further comprising a second controller configured to provide said reference signal to said first controller.

4. The electronic charger, according to claim 3, further comprising a second sensor configured to provide a second sensing signal indicative of an output voltage at said output terminals, said second controller being configured to acquire said second sensing signal and process the information provided by said second sensing signal to provide said reference signal.

5. The electronic charger, according claim 4, further comprising a third sensor configured to provide a third sensing signal indicative of an input voltage at said input terminals, said second controller being configured to acquire said third sensing signal and process the information provided by said third sensing signal to provide said reference signal.

6. The electronic charger, according to claim 4, further comprising a fourth sensor configured to provide a fourth sensing signal indicative of an operating temperature of said electronic charger, said second controller being configured to acquire said fourth sensing signal and process the information provided by said fourth sensing signal to provide said reference signal.

7. The electronic charger, according claim 1, wherein:
said input inductor has a first terminal, which is electrically connected to a first input terminal, and a second terminal, which is electrically connected to a first terminal of said coupling capacitor;
said switching device has a first terminal, which is electrically connected to the second terminal of said input inductor and to the first terminal of said coupling capacitor, and a second terminal, which is electrically connected to a second input terminal.

8. The electronic charger, according to the claim 7, wherein:
said blocking device is a blocking diode having a first terminal, which is electrically connected to a second terminal of said coupling capacitor, and a second terminal, which is electrically connected to a first output terminal;
said output inductor has a first terminal, which is electrically connected to the first terminal of said blocking diode and to the second terminal of said coupling capacitor, and a second terminal, which is electrically connected to a second output terminal;
said output capacitor has a first terminal, which is electrically connected to said first output terminal, and a second terminal, which is electrically connected to said second output terminal.

9. An electric power distribution installation comprising an electronic charger, according to claim 1.

10. A switching apparatus comprising an electronic charger, according to claim 1.

11. A control method for an electronic charger for electric power distribution installations, the electronic charger comprising:
input terminals, which are electrically connectable to an electric power supply;
output terminals, which are electrically connectable to an electric load to be charged;
a DC/DC converter of SEPIC type comprising:
an input stage electrically connected with said input terminals and comprising an input inductor, which is configured to store electric energy provided by said power supply, and a switching device, which is configured to control a charging process of said input inductor;
an output stage electrically connected with said output terminals and comprising an output inductor, which is magnetically coupled with said input inductor, an output capacitor, which is configured to store electric energy to feed said capacitive load, and a blocking device, which is configured to prevent the flow of a discharging current from said output capacitor towards said input and output inductors;
a coupling capacitor, which is configured to electrically couple said input stage and said output stage by means of a capacitive coupling;
a first sensor configured to provide a first sensing signal indicative of a charging current flowing through said input inductor, when said switching device is in an ON state;
a first controller configured to acquire said first sensing signal and a reference signal indicative of a reference value for said charging current and configured to provide a driving signal for controlling said switching device, said first controller being configured to turn said switching device in an ON state at predefined switch-on instants ($t_{ON}$) and to turn said switching device in an OFF state at switch-off instants ($t_{OFF}$), which are determined by said controller by processing the information provided by said first sensing signal and said reference signal;

the method comprises the followings steps:
acquiring the first sensing signal indicative of the charging current, which flows through said input inductor to charge said input inductor, when said switching device is in an ON state;
acquiring the reference signal indicative of the reference value for said charging current;
providing the driving signal for controlling said switching device, said driving signal being configured so that said switching device is turned in an ON state at predefined switch-on instants ($t_{ON}$) and is turned in an OFF state at switch-off instants ($t_{OFF}$), which are determined by processing the information provided by said first sensing signal and said reference signal.

12. The control method, according to claim 11, wherein said switch-on instants ($t_{ON}$) have a predefined frequency.

13. The control method, according to claim 11, further comprising the following steps:
   acquiring a second sensing signal indicative of an output voltage at said output terminals;
   process the information provided by said second sensing signal to provide said reference signal.

14. The control method, according to claim 13, further comprising the following steps:
   acquiring a third sensing signal indicative of an input voltage at said input terminals;
   process the information provided by said third sensing signal to provide said reference signal.

15. The control method, according to claim 13, further comprising the following steps:
   acquiring a fourth sensing signal indicative of indicative of an operating temperature of said electronic charger;
   process the information provided by said fourth sensing signal to provide said reference signal.

* * * * *